Oct. 6, 1959
M. M. CRONK ET AL
2,907,476
MECHANICAL POLE SWITCHING DEVICE
Filed Nov. 12, 1953
3 Sheets-Sheet 1
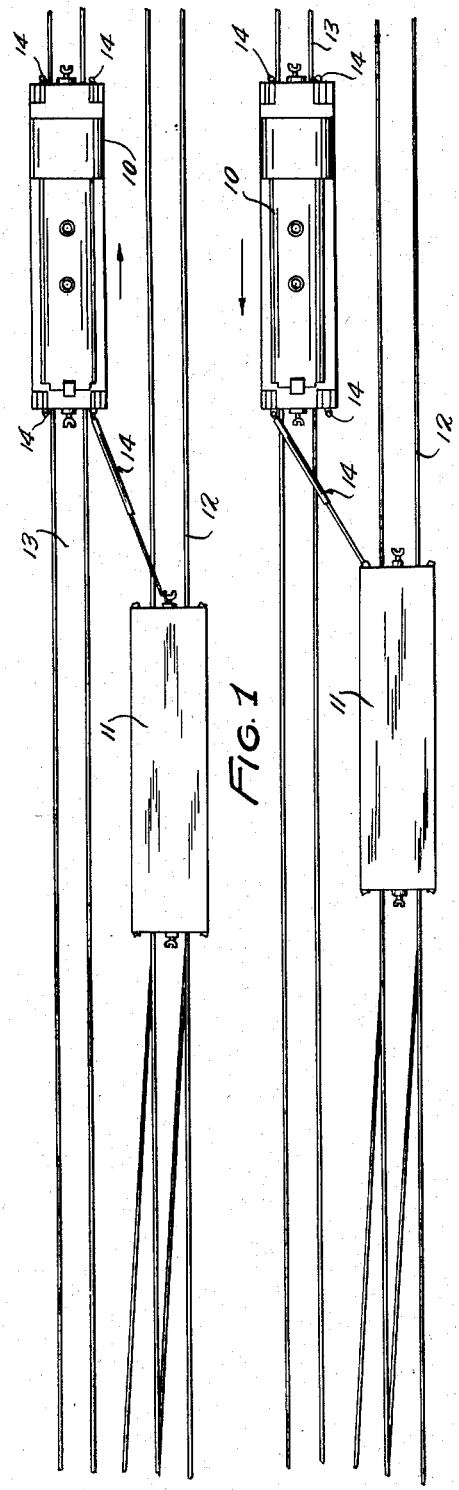
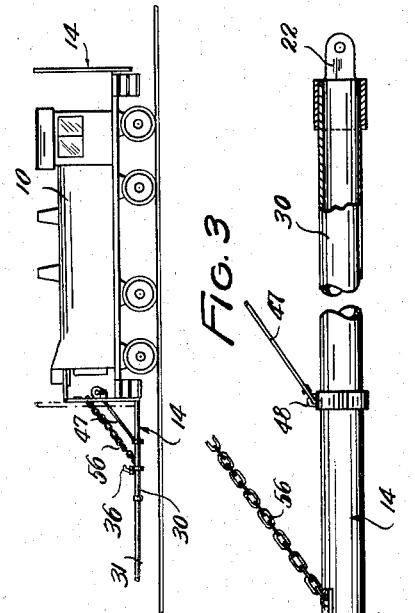
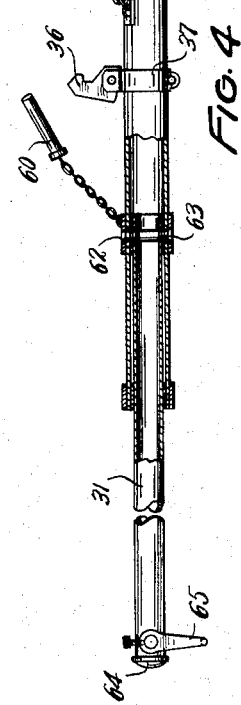
INVENTORS
MILO M. CRONK
RUSSELL A. MORRISON
BY
Hudson, Daughton,
Williams, David & Hoffmann
ATTORNEYS

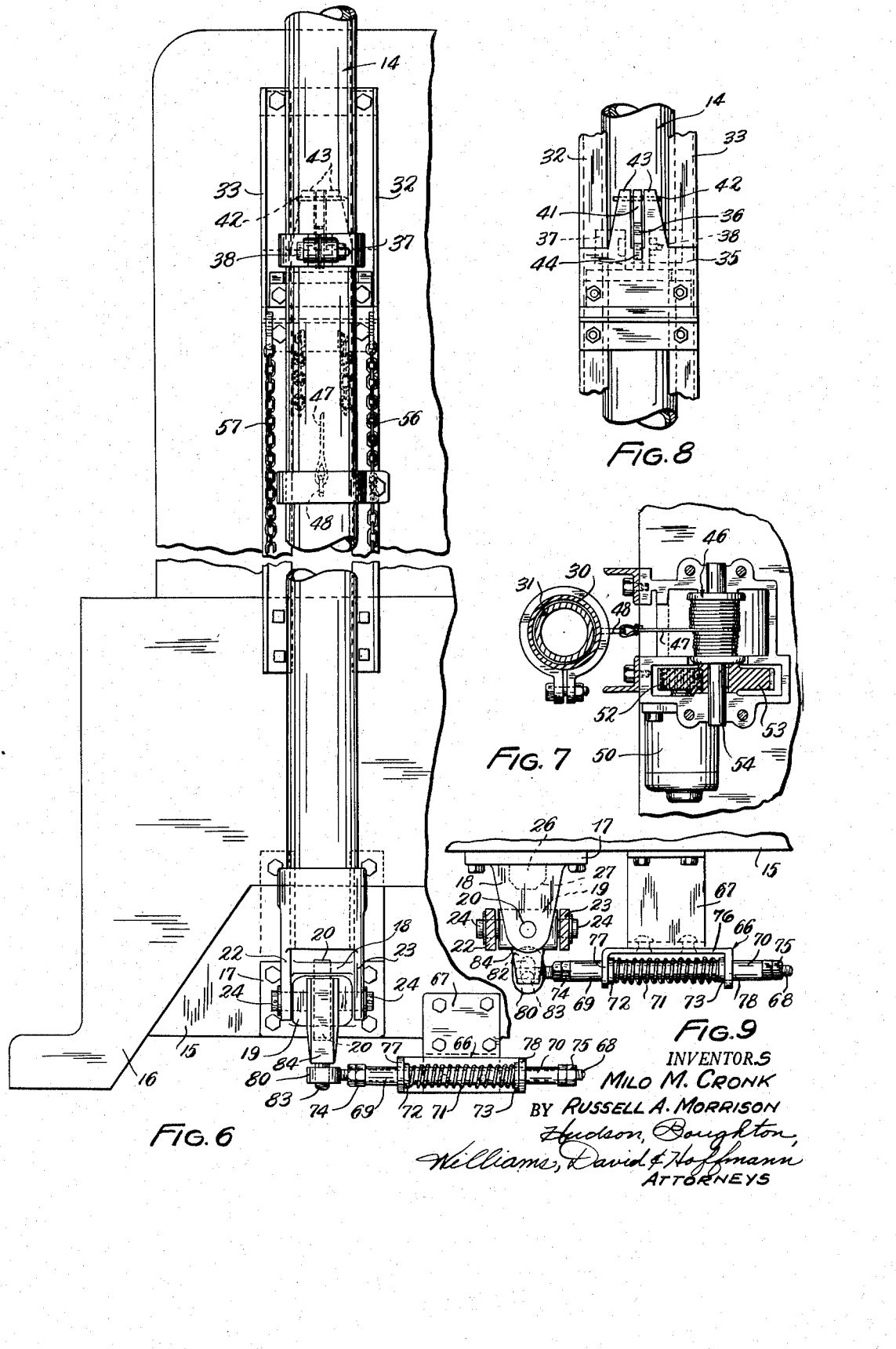

United States Patent Office 2,907,476
Patented Oct. 6, 1959

2,907,476

MECHANICAL POLE SWITCHING DEVICE

Milo M. Cronk, Detroit, Mich., and Russell A. Morrison, Beechwood Village, Ohio

Application November 12, 1953, Serial No. 391,637

4 Claims. (Cl. 213—224)

The present invention relates to switching locomotives and, more particularly, to switching locomotives provided with means for moving a car on a track adjacent to the track of the locomotive.

It is desirable to provide switching locomotives with a force transmitting means such as a pole to enable the locomotive to move cars on an adjacent track without entering the track. While various types of force transmitting means have heretofore been proposed, they have failed to provide the necessary flexibility or have created a hazard when in use so as to endanger the switching crew.

The principal object of the present invention, therefore, is the provision of a switching locomotive having in combination therewith novel means enabling the locomotive to move a car located on a track running adjacent to the locomotive track, the means being so constructed and arranged that the switching locomotive has maximum flexibility and is capable of efficiently meeting the various switching needs, such as turning cars out and pulling or pushing cars on adjacent tracks, without endangering the switching crew.

Another object of the present invention is the provision of a new and improved switching locomotive having pole means supported thereby for moving a car on an adjacent track, the means being so constructed and arranged that the locomotive may without leaving its track move a car from a siding or stub track to a position on the locomotive track either in front of or behind the locomotive.

A further object of the present invention is the provision of a new and improved switching locomotive having a pole, or stake, for enabling the locomotive to push or pull a car on a track adjacent to the locomotive track and releasable means for securing the pole in an inactive, out-of-the-way position when not in use, the releasable means being actuated to secure the pole in its inactive position by the movement of the pole to the inactive position.

A still further object of the present invention is the provision of a new and improved switching locomotive having a pole universally mounted thereon for pushing or pulling a car located on an adjacent track, and means for limiting the downward movement of the pole, the pole being so supported that it has a wide range of movement in the vertical and horizontal direction and may be swung in both a horizontal and vertical arc about its point of connection to the locomotive and is urged horizontally to a center position whenever the pole is swung therefrom.

Referring to the accompanying drawings forming a part of this specification,

Fig. 1 is a plan view showing a switching locomotive embodying the present invention being used to pull a car on a track adjacent the track of the locomotive;

Fig. 2 is a view similar to Fig. 1, but illustrating the use of a switching locomotive embodying the present invention to push a car on a track adjacent to the locomotive track;

Fig. 3 is a side elevational view of a switching locomotive embodying the present invention;

Fig. 4 is a detached view partly in section of the switching pole used with the present invention;

Fig. 6 is an enlarged fragmentary front elevational view of the locomotive and switching pole;

Fig. 7 is a view taken approximately along line 7—7 of Fig. 5;

Fig. 8 is a view taken approximately along line 8—8 of Fig. 5; and,

Fig. 9 is a fragmentary plan view of the universal mounting and spring biasing means for the pole illustrated in Fig. 4.

Figure 5:
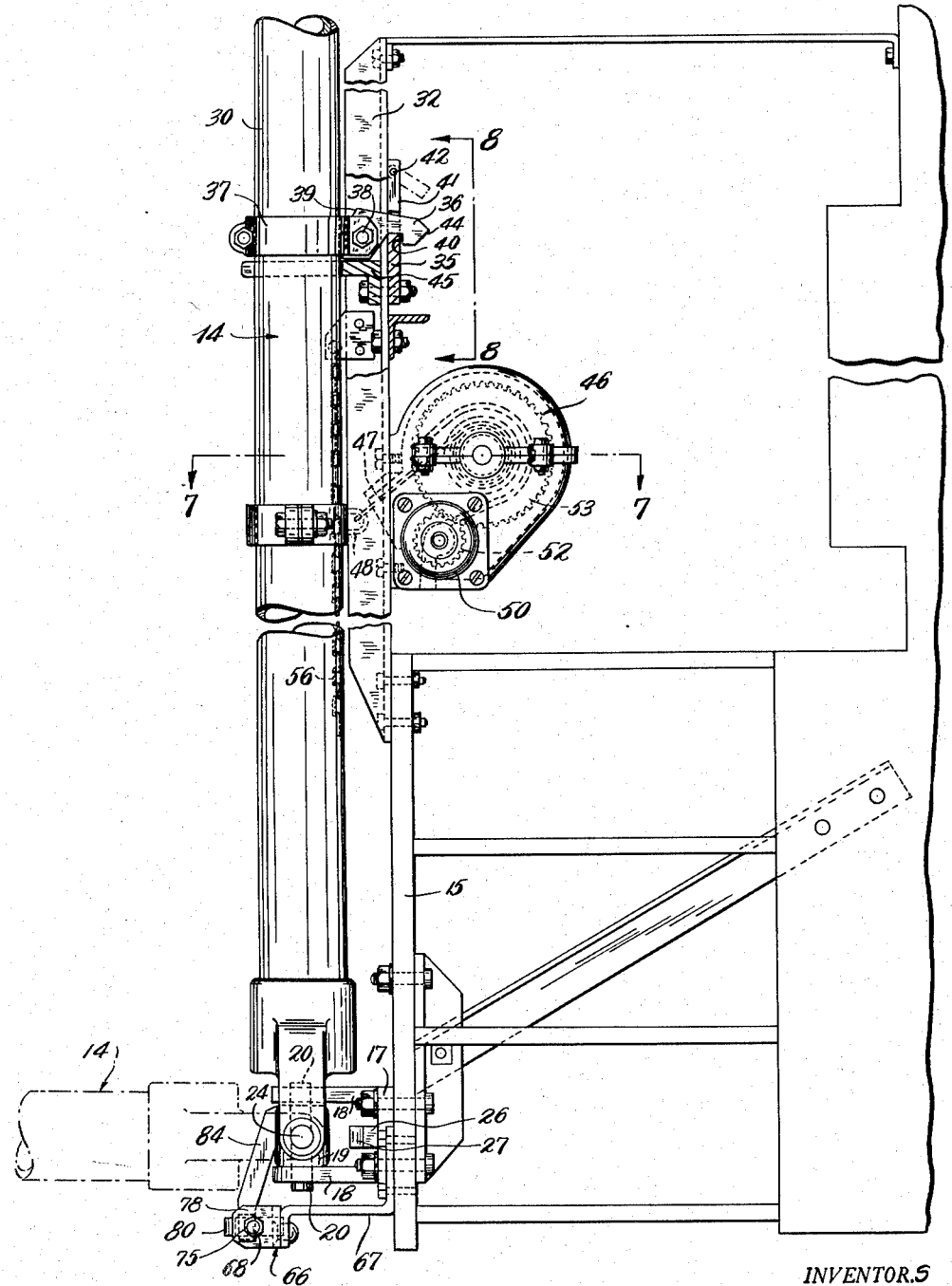
Fig. 5 is a fragmentary side elevational view of the front portion of the locomotive showing the pole of Fig. 4 mounted thereon.

Referring to the drawings, Figs. 1 and 2 show a locomotive 10 embodying the present invention being used to switch or move a car 11 which is located on a track 12 adjacent to the locomotive track 13. A force transmitting connection between the locomotive 10 and the car 11 is provided by a stake or pole 14 universally mounted on the locomotive. In the illustrated embodiment of our invention the locomotive is provided with four such poles, two being mounted on the front of the locomotive and two on the rear of the locomotive. The poles 14 are located adjacent each corner of the locomotive and assure that the various switching requirements may be easily met. Fig. 1 illustrates the use of the pole on the front left hand side of the locomotive to pull the car 11 on the adjacent track while Fig. 2 shows the use of the pole mounted on the right hand front of the locomotive to push the car 11 along the track 12.

The method and means for supporting each pole on a locomotive 10 is the same and therefore the support for a single pole 14 on the front of the locomotive will be described, it being understood that the same construction may be utilized to support the other three poles. The base of the pole 14 is universally secured to a vertical plate 15 supported by suitable frame members from the front of the locomotive. The plate 15 may be a part of front plate 16 of the locomotive. The universal mounting for supporting the pole comprises a yoke 17 fixed to plate 15 having two vertically spaced arms 18 adapted to pivotally support a block 19 for movement about a vertical axis. The block 19 is provided with vertically extending pins 20 received by apertures in the arms of yoke 17. A second yoke member is secured to the base of pole 14 and has arms 22, 23 adapted to straddle the block 19 and to be pivotally secured thereto by horizontal pins 24 extending from opposite ends of the block 19 into receiving apertures in the arms 22, 23 respectively. It is readily apparent from the description and drawings that the universal mounting for the pole 14 will allow the outer end of the pole to move in a horizontal arc about the vertical axis of rotation of the block 19 and in a vertical arc about the axis of the pins 24, thereby providing a pole which may be swung vertically or sideways about its base to meet the various switching needs. The sideways movement of the pole 14 with respect to the locomotive may be limited by a horizontal stop plate 26 mounted intermediate the arms of the bracket 17. The plate 26 is suitably cut as at 27 so that the arms 22 and 23 will abut the plate when the pole has swung approximately 45° from its center position.

The pole 14 is comprised of two telescoping sections 30, 31, the section 30 being connected at one end to the universal mounting for the pole and the section 31 telescoping within the section 30. For securing the pole in an upright position angle iron uprights 32, 33 extending upwardly from the front plate of the locomotive are provided. The uprights 32, 33 support a latch plate 35 adapted to be engaged by a latching lever 36 secured to the pole 14 by a band 37 which encircles the section 30 of the telescoping pole. The latching lever 36 extends from the rear side of the pole 14 along a line generally perpendicular thereto and is pivotally secured to the band 37 by a bolt 38 which allows vertical pivotal movement of the lever. The backside of the latching lever is cut away as illustrated at 39 to allow limited counterclockwise movement about the bolt 38 from the normal position of the lever 36. When the pole 14 is moved upwardly to a vertical position the latching lever will cam over the plate 35 until a notch 40 in the lower surface of the lever registers with the top edge of the plate allowing the lever to move downwardly to the position illustrated in Fig. 5. The pole is now prevented from downward movement by reason of the locking action of the plate 35 and the notch 40. The latch may be released by merely lifting the lever 36. In order to assure that the lever 36 is not released accidentally a dog 41 is pivotally mounted on a horizontal pin 42 supported between spaced vertical extensions of the plate 35 on either side of the lever 36. The dog 41 normally hangs from the pin 42 so that the lower end of the dog terminates at a point just above the top of the latching lever 36 when the lever is in its locking position. The dog prevents the lever from raising and becoming disengaged from the plate 35. The dog 41 may be swung about its pivot pin 42 to enable the latching lever to be released by lifting the lever upwardly. It is to be noted that the latching lever 36 will move the dog 41 out of the way when the pole 14 is being moved to its vertical position thereby allowing the latching lever 36 to cam over and engage the plate 35. The lower edge of the lever 36 between the notch and outer end is cut to provide a cam surface 44 for lifting the lever, as the pole is moved to its inactive position. To guide the pole 14 into its latched position a U-shaped guide member 45 is secured transversely of the angle irons immediately below the top of the latching plate 35. The guide member extends substantially horizontally and is provided with a U-shaped opening adapted to receive the pole 14.

A power means is provided to raise and lower the pole 14. In the illustrated embodiment a reel 46 is mounted on the frame formed by the uprights 32, 33 and has its reel line 47 connected to a loop 48 on section 30 of the pole 14. The reel 46 is driven by a hydraulic motor 50 through suitable gearing which comprises in the illustrated embodiment a pinion gear 52 secured to the shaft of the motor 50 and in mesh with a gear 53 mounted on the shaft 54 of the reel. The present invention is not limited to the particular type of motor used with the reel nor is the location of the motor and reel of primary importance. The motor, however, is preferably of the type which must be actuated before movement will take place in either direction. Such motors are commercially available and may be a hydraulic motor in which trapped fluid prevents coasting of the motor or a brake may be utilized to prevent rotation of the motor when the actuating force is removed. This type of motor is desirable to prevent rapid fall of the pole 14 and to assure that the crewman has complete control of the pole at all times. In order to limit the downward movement of the pole a safety chain is secured between the pole 14 and the uprights 32, 33. In the illustrated embodiment two such chains 56, 57 are shown secured at one end to uprights 32, 33 respectively and at the other end to the pole 14.

The pole 14 is formed of telescoping sections so that the height of the pole when it is in its inactive vertical position is not greater than that allowed by minimum clearances to which the locomotive may be subjected. The section 31 telescopes within the section 30 and when the pole is dropped into its operating position the section 31 may be moved outwardly to lengthen the pole 14. Fig. 4 illustrates the details of the extended pole and as illustrated therein a pin 60 is provided to prevent the sections from telescoping when in use. The pin 60 is adapted to pass through apertures 62, 63 in the sections 30, 31 respectively, the apertures being aligned when the pole is in its extended position. The end of the pole 14 is provided with a rounded surface 64 which is adapted to be received by conventional pads on the cars to be moved. A clevis 65 is also secured to the outer end of section 31 so that the pole may be utilized in the manner illustrated in Fig. 1 to pull a car along an adjacent track.

The pole 14 is preferably biased against movement in a horizontal plane by a spring biasing means 66 fixed to the front plate of the locomotive by a support bracket 67. The spring biasing means 66 comprises a horizontal shaft 68 mounted generally parallel to the front of the locomotive. The shaft 68 has mounted thereon two sleeves 69, 70 spaced by a spring 71 which abuts flanges 72, 73 on the inner end of sleeves 69, 70 respectively. The outward movement of sleeves 69, 70 with respect to the shaft 68 is limited by nuts 74, 75 on the ends of the shaft. A yoke member 76 secured to the bracket 67 supports the shaft 68 and sleeves 69, 70 and has apertures in its horizontally extending arms 77, 78 through which the sleeves 69, 70 respectively pass. The sleeves 69, 70 are movable with respect to the shaft 68 and are allowed to move inwardly toward the center of the shaft by the yoke 76. The left hand end of the shaft 68 as viewed in Fig. 6 is provided with a collar 80 having an elongated aperture 82 therein adapted to receive a pin 83 of a member 84 which is secured to the face of the block 19. The pin 83 extends downwardly and generally parallel to the face of the block 19 at a spaced distance therefrom. As the pole 14 is rotated, the block 19 is also rotated moving the pin 83 through an arc which causes the shaft 68 to move in a manner so as to compress the spring 71. If the block is rotated counterclockwise the sleeve 69 will be moved inwardly and compress the spring 71 against the flange 73 of sleeve 70. The sleeve 70 is held against movement by the arm 78 which abuts the flange 73. If the block 19 is moved clockwise the shaft 68 will be moved so that stop nut 75 moves the sleeve 70 inwardly to compress the spring 71 against the shoulder 72 of the sleeve 69. The elongated aperture 82 in the collar 80 allows relative movement between the pin 83 and the collar so that the pin may sweep through its normal arc. It can be seen from the above description that the spring biasing means 66 tends to maintain the pole 14 in a center position and will prevent the pole from being whipped by the wind and also provide a shock absorber for sudden impacts.

The illustrated embodiment shows a locomotive equipped with four poles. This is an extremely flexible arrangement and assures that all switching needs will be adequately met. The invention, however, is not limited to the use of four poles as such. A locomotive having a single pole at each end of the locomotive is flexible enough to meet most of the switching operations which are normally encountered. If a single pole is used it is preferably mounted in the center front or center back of the locomotive to provide an equal swing to either side of the locomotive. Preferably the locomotive always has a pole in the front or back to enable it to move a car from a siding to a position either in front of or in back of the locomotive.

It is apparent from the foregoing description that we have provided an extremely flexible switching locomotive which has a force transmitting means mounted thereon enabling the locomotive to move cars located on an adjacent track without endangering the crew performing the switching operation. The invention also provides a means for raising and lowering the pole as well as means for securing the pole in its inactive position and assuring that it will not accidentally be released.

Having thus described our invention, we claim:

1. A locomotive for switching operations adapted to operate on one of a pair of adjacent tracks and including a stake providing a force transmitting connection between the locomotive and a car to be moved thereby, said car being on either the same track as the locomotive or the track adjacent to the track of the locomotive and said stake being of sufficient length to move said car when on the track adjacent to the track of the locomotive, universal means connecting the base of said stake to said locomotive and supporting said stake for free vertical swinging movement in a vertical plane from a horizontal position to a vertical inactive position and for horizontal swinging movement from said plane, latch means including engageable parts on said locomotive and said stake respectively for releasably securing said stake in said vertical inactive position, a first member, means supporting said first member on said locomotive for movement in either of two opposite directions, motion transmitting means for transmitting the horizontal component of movement of said stake, means operatively connecting said motion transmitting means to said stake and to said first member to move the latter with said stake when said stake is swung horizontally, said first member having a predetermined position corresponding to the position of said stake when in said plane, and spring biasing mechanism mounted on said locomotive for yieldably opposing movement of said first member in either direction from its said predetermined position and yieldably urging said first member to said predetermined position when moved therefrom, said mechanism comprising a spring, means connecting said spring with said locomotive, and means operatively connecting said spring to said member to yieldably oppose movement thereof from said predetermined position.

2. A locomotive for switching operations having in combination therewith a stake comprised of telescoping sections and providing a force transmitting connection between the locomotive and a car to be moved thereby, universal means securing the base of said stake to the locomotive and supporting said stake for free vertical swinging movement in a vertical plane from a horizontal position to an inactive vertical position and for horizontal swinging movement from the vertical plane, said universal means comprising a support bracket on said locomotive, a first support member, pivotal connections connecting said first support member to said bracket for rotation about a vertical axis, pivotal connections connecting said stake to said first support member for rotation about a horizontal axis, releasable means including engageable parts on said locomotive and stake respectively for securing said stake in said inactive vertical position, a shaft, a support member mounting said shaft on said locomotive for axial movement relative thereto, a connection operatively connecting said shaft to said first support member to move said shaft axially upon movement of said first support member about its said axis of movement, said shaft having a predetermined position corresponding to the position of said first support member when said stake is in said vertical plane, biasing mechanism for said shaft mounted on said locomotive and comprising a spring, and means operatively connecting said spring with said locomotive and with said shaft to yieldably oppose movement of said shaft from said predetermined position and to urge the return of said shaft to said predetermined position when moved therefrom.

3. A locomotive for switching operations having in combination therewith a stake comprised of telescoping sections and providing a force transmitting connection between a locomotive and a car to be moved thereby, a universal joint securing the base of said stake to the locomotive and supporting said stake for free vertical swinging movement in a vertical plane between a horizontal position and a vertical inactive position and for horizontal swinging movement from said vertical plane, releasable means for automatically securing said stake in said inactive vertical position upon movement of the stake thereto comprising cooperating engageable latching members connected to said stake and said locomotive respectively, power means for raising and lowering said stake comprising a line connected at one end to said stake, a reel about which said line is wrapped for winding and unwinding said line to respectively raise and lower said stake and motor means for operating said reel, means mounting said reel and said motor means on said locomotive and in operative relationship with said stake, biasing mechanism on said locomotive including spring means, means connecting said spring means with said locomotive, and means operatively connecting said spring means to said stake to yieldably oppose the horizontal swinging movement of said pole in either horizontal direction from said vertical plane.

4. A locomotive as defined in claim 3 wherein said universal means comprises a support bracket on said locomotive, a first support member, pivotal connections connecting said first support member to said bracket for rotation about a vertical axis and pivotal connections connecting said stake to said first support member for rotation about a horizontal axis; and said means operatively connecting said spring means to said stake comprises a shaft, a support member mounting said shaft on said locomotive for axial movement in either direction relative thereto, and a connection operatively connecting said shaft to said first support member to move said shaft axially upon movement of said first support member about its said vertical axis, said shaft having a predetermined position corresponding to the position of said first support member when said stake is in its said vertical plane, and means operatively connecting said spring means to yieldably oppose movement of said shaft from its said predetermined position and to urge the return of said shaft to said predetermined position when moved therefrom.

References Cited in the file of this patent

UNITED STATES PATENTS

| | | |
|---|---|---|
| 63,600 | Wooten et al. | Apr. 2, 1867 |
| 400,518 | Toohey | Apr. 2, 1889 |
| 1,157,492 | Arthur | Oct. 19, 1915 |
| 1,192,772 | Eaton | July 25, 1916 |
| 1,320,359 | Barron | Oct. 28, 1919 |
| 1,474,658 | Warren | Nov. 20, 1923 |
| 1,578,059 | Myer | Mar. 23, 1926 |
| 1,796,211 | Moore et al. | Mar. 10, 1931 |
| 1,808,378 | Richards | June 2, 1931 |
| 1,848,956 | Koehler | Mar. 8, 1932 |
| 2,199,470 | Taylor | May 7, 1940 |
| 2,304,762 | Larsson | Dec. 8, 1942 |
| 2,469,118 | Kinne et al. | May 3, 1949 |
| 2,580,588 | Pagenkemper et al. | Jan. 1, 1952 |